Patented Dec. 16, 1924.

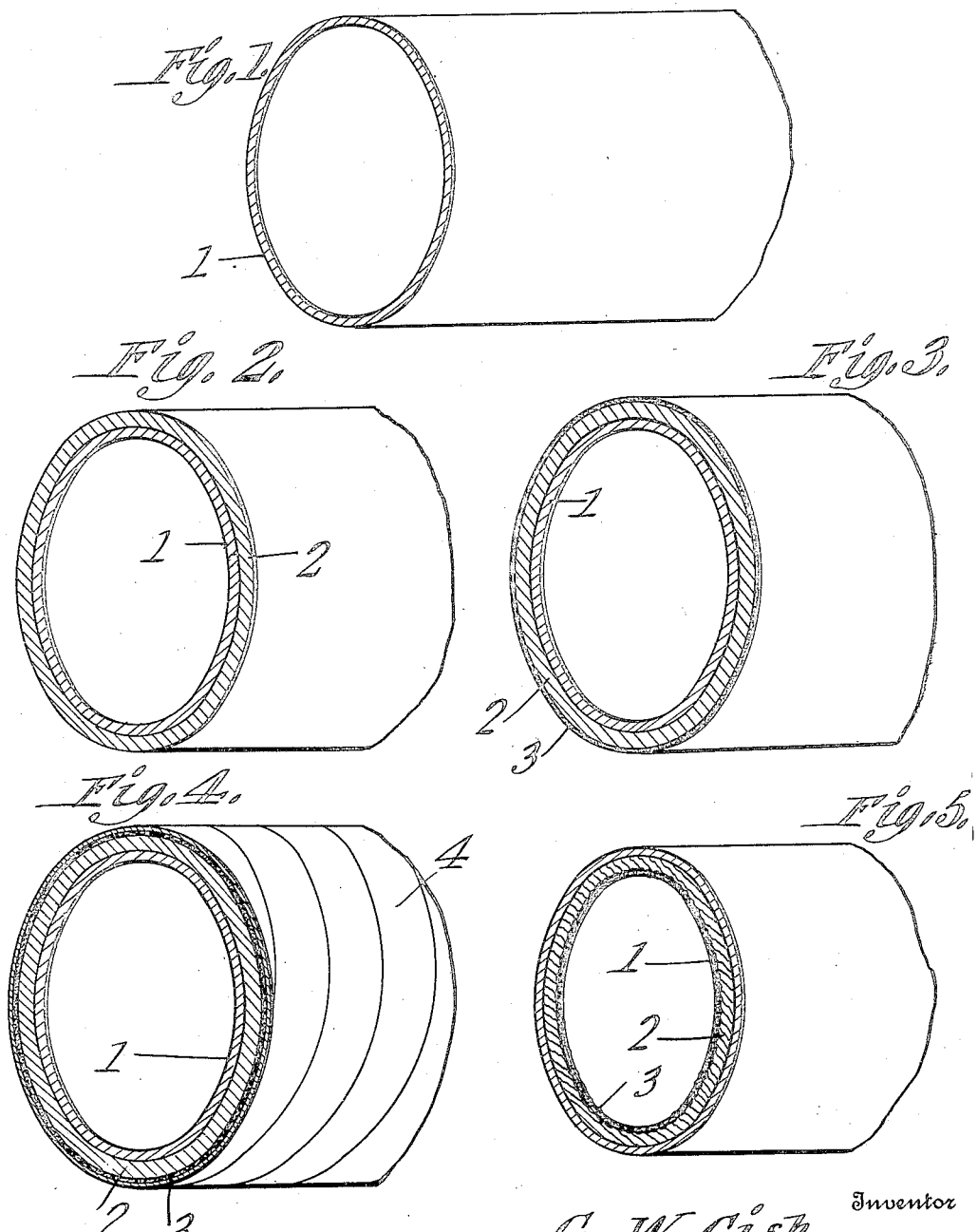

1,519,729

UNITED STATES PATENT OFFICE.

GEORGE W. GISH, OF ATLANTA, GEORGIA.

RUBBER COMPOSITION.

Application filed April 23, 1920. Serial No. 376,067.

*To all whom it may concern:*

Be it known that I, GEORGE W. GISH, a citizen of the United States, residing at Atlanta, in the county of Fulton and State of Georgia, have invented a new and useful Rubber Composition, of which the following is a specification.

This invention relates to a composition of matter in the form of a rubber composition for use primarily in the manufacture of a self-sealing inner tube for pneumatic tires, one of the objects of the invention being to provide a rubber composition which, when applied to a tube will add but slightly to the weight thereof, will heal a puncture produced at any point within the wall of the tube, and will prevent the opposed walls of the tube from adhering to each other when collapsed.

With the foregoing and other objects in view the invention consists of certain ingredients assembled as hereafter more fully described and pointed out in the claims.

In the accompanying drawings the composition of matter has been shown applied to the inner tube of a pneumatic tire.

In said drawings—

Figure 1 is a perspective view of a portion of a tube and showing the first layer of high grade rubber used in the formation of the tube.

Figure 2 is a similar view showing the layer of high grade rubber provided with a supplemental layer of rubber compound.

Figure 3 is a view similar to Figures 1 and 2 and showing the layer of compound provided with a covering of powdered material which enters into the outer strata of the compound.

Figure 4 is a perspective view showing the tube wrapped prior to being vulcanized.

Figure 5 is a perspective view of a portion of the finished tube, the same having been turned inside out subsequent to the vulcanizing process.

In manufacturing the tube the same is built up inside out. A layer of high grade rubber is first applied to the mandrel after which the inner wall or plastic stock is applied by the simple operation of rolling the mandrel over the stock so as to bring said stock on the outer surface of the inner thickness of high grade stock. The exposed surface of the plastic stock is then treated with a powdered substance consisting of seventy per cent soapstone and thirty per cent powdered mica. This powder is pressed into the surface of the plastic stock after which the entire tube is cross wrapped with cotton tape and placed in a standard inner tube vulcanizer where it is held for approximately one hour and fifty minutes at a temperature of 289°, live steam being used for this purpose. After the tube has been vulcanized it is removed from the mandrel, the wrapping is removed and the tube is turned inside out so as to bring the layer or thickness of high grade stock outermost while the inner wall of the tube will be formed of plastic material.

The plastic stock used in the manufacture of the tube preferably consists of the following ingredients substantially in the proportions stated:

| | Per cent. |
|---|---|
| Coarse Pará rubber | 60 |
| First latex (plantation rubber) | 15 |
| Mineral rubber | 20 |
| Rubber solution | 4¾ |
| Sulphur flour | ¼ |

The plastic stock above described will, when subjected to the heat during the vulcanizing process, be cured to the outer wall of the high grade rubber stock but will not be cured itself. This plastic stock is to be milled and calendered and cut into desired lengths the same as any other rubber stock known to the trade.

It has been found in practice that when a tube such as herein described is punctured, the plastic stock forming the inner layer will heal the puncture automatically. By finishing the inner surface of the plastic stock with the powdered soapstone and mica the tube, when collapsed will not stick together in warm weather.

Referring to the drawings it will be seen that the high grade rubber stock is indicated at 1, the rubber composition at 2, and the film of rubber composition mixed with soapstone and mica is illustrated at 3. The cotton wrapping used in carrying out the process has been indicated at 4.

What is claimed is:

1. A composition of matter consisting of coarse Pará rubber, first latex rubber, mineral rubber, rubber solution and sulphur flour.

2. A composition of matter consisting of the following ingredients substantially in the proportions stated, to wit, coarse Pará rubber 60%, first latex rubber 15%, mineral rubber 20%, rubber solution 4¾%, and sulphur flour ¼%.

In testimony that I claim the foregoing as my own, I have hereto affixed my signature in the presence of two witnesses.

GEORGE W. GISH.

Witnesses:
   I. L. BOINEST,
   A. T. DISSEL.